United States Patent
Bradbrook

(10) Patent No.: US 11,383,848 B2
(45) Date of Patent: Jul. 12, 2022

(54) SUPERSONIC AIRCRAFT PROPULSION INSTALLATION

(71) Applicant: ROLLS-ROYCE plc, London (GB)

(72) Inventor: Stephen J Bradbrook, Bristol (GB)

(73) Assignee: ROLLS-ROYCE plc, London (GB)

( * ) Notice: Subject to any disclaimer, the term of this patent is extended or adjusted under 35 U.S.C. 154(b) by 414 days.

(21) Appl. No.: 16/449,527

(22) Filed: Jun. 24, 2019

(65) Prior Publication Data

US 2020/0017226 A1    Jan. 16, 2020

(30) Foreign Application Priority Data

Jul. 12, 2018  (GB) .................................... 1811401

(51) Int. Cl.
  B64D 27/16    (2006.01)
  B64C 30/00    (2006.01)
  (Continued)

(52) U.S. Cl.
  CPC .............. B64D 27/16 (2013.01); B64C 30/00 (2013.01); F02K 3/04 (2013.01); F02K 3/12 (2013.01);
  (Continued)

(58) Field of Classification Search
  CPC ...... F02C 6/00; F02C 7/04; F02C 7/32; F02C 7/36; F02K 3/04; F02K 3/12; F02K 5/00;
  (Continued)

(56) References Cited

U.S. PATENT DOCUMENTS 3,154,915 A * 11/1964 Eichholtz ................ F02C 6/003
                                                  60/244
3,659,422 A *  5/1972 Hope ..................... F02K 1/1207
                                                  60/224

(Continued)

FOREIGN PATENT DOCUMENTS

FR        1055264 A     2/1954
WO     97/48600 A1     12/1997

OTHER PUBLICATIONS

Dec. 21, 2018 Search Report issued in Great Britain Patent Application No. 1811401.7.

(Continued)

*Primary Examiner* — Jason H Duger
(74) *Attorney, Agent, or Firm* — Oliff PLC

(57) ABSTRACT

A propulsion system includes a main gas turbine engine adapted for generating propulsive thrust during subsonic and supersonic flight operations and a supplementary propulsion unit adapted for generating additional thrust. The supplementary propulsion unit has an air intake and an exhaust for gas accelerated by the supplementary propulsion unit to provide the additional thrust and is adapted to generate the additional thrust during a limited range of subsonic flight operations, and to be dormant during other flight operations. The propulsion system has housing for the supplementary propulsion unit, including intake and exhaust covers which are moveable between deployed and stowed configurations. During the limited range of subsonic flight operations the intake and exhaust cover are moved to the deployed configuration to open the intake and the exhaust. During other flight operations the intake and exhaust cover are moved to the stowed configuration to close the intake and the exhaust.

15 Claims, 3 Drawing Sheets

(51) Int. Cl.
*F02K 3/04* (2006.01)
*F02K 3/12* (2006.01)
*B64D 33/02* (2006.01)

(52) U.S. Cl.
CPC .................. *B64D 2033/026* (2013.01); *B64D 2033/0286* (2013.01); *F05D 2220/80* (2013.01)

(58) Field of Classification Search
CPC .. B64D 2027/026; B64D 27/16; B64D 27/24; B64D 2033/026; B64D 2033/0286; B64C 30/00; F05D 2220/80
See application file for complete search history.

(56) References Cited

U.S. PATENT DOCUMENTS

| | | | |
|---|---|---|---|
| 4,222,235 A * | 9/1980 | Adamson | F02C 6/003 60/226.1 |
| 5,105,615 A | 4/1992 | Herzog | |
| 5,289,995 A | 3/1994 | Greene | |
| 5,529,263 A | 6/1996 | Rudolph | |
| 6,834,495 B2 * | 12/2004 | Saito | F02C 3/10 60/224 |
| 8,402,740 B2 * | 3/2013 | Guemmer | F02K 3/077 60/226.1 |
| 8,701,381 B2 * | 4/2014 | Eames | B64D 27/14 60/39.163 |
| 9,346,551 B2 * | 5/2016 | Stretton | B64D 27/14 |
| 2002/0189230 A1 * | 12/2002 | Franchet | F02K 3/075 60/204 |
| 2002/0190158 A1 * | 12/2002 | Franchet | F02C 7/36 244/55 |
| 2002/0190159 A1 | 12/2002 | Franchet et al. | |
| 2005/0211822 A1 | 9/2005 | Franchet et al. | |
| 2015/0344158 A1 | 12/2015 | Ferreira et al. | |
| 2016/0347463 A1 | 12/2016 | Negulescu | |
| 2017/0002768 A1 | 1/2017 | Bowcutt et al. | |
| 2018/0044028 A1 * | 2/2018 | Takami | B64D 27/18 |

OTHER PUBLICATIONS

Dec. 6, 2019 Search Report issued in European Patent Application No. 1918750.1.

* cited by examiner

SUPERSONIC AIRCRAFT PROPULSION INSTALLATION

CROSS-REFERENCE TO RELATED APPLICATIONS

This specification is based upon and claims the benefit of priority from United Kingdom patent application number GB 1811401.7 filed on Jul. 12, 2018, the entire contents of which are incorporated herein by reference.

BACKGROUND

Field of the Disclosure

The present disclosure relates to a propulsion installation for a supersonic aircraft

Description of the Related Art

There is a growing interest in the development of supersonic aircrafts for civil use. In particular, gas turbine engine systems that effectively provide thrust in subsonic, transonic and supersonic flight regimes, with reduced noise output during certain operations, are of interest.

Such engines have special adaptations relative to more conventional engines used purely for subsonic flight. For example, gas turbine engines are not designed to operate with an airflow velocity that is greater than Ma 1.0 (Ma=Mach number) for the airflow entering the engine compression section. Therefore, for supersonic flight, the inlet to the gas turbine engine must be specially shaped to slow the velocity of the airflow down to a predetermined level below Ma 1.0.

As to noise reduction and engine efficiency, these can both be improved compared to a pure turbojet by adopting a low bypass ratio turbofan configuration. In particular, this can provide sufficiently high exhaust jet velocities for supersonic flight, while improving engine efficiency and significantly reducing noise generated by the exhaust jet.

However, gas turbine engines designed for supersonic flight are at a disadvantage at the low subsonic speeds occurring at take-off and initial climb compared, for example, to conventional high bypass ratio civil turbofans. In particular, features such as the specially shaped inlet and the low bypass ratio needed for supersonic flight make the engine relatively inefficient to operate at such low speeds where the engine may be far from its design point. Also, while a low bypass ratio turbofan may be quieter than a turbojet, it will still generally be significantly noisier to operate than a high bypass ratio turbofan, and the need to reduce noise levels is particularly acute at take-off and climb.

Thus it would be desirable to provide a propulsion system for a supersonic aircraft which addresses these issues.

SUMMARY OF THE DISCLOSURE

In a first aspect, the present disclosure provides a propulsion system for a supersonic aircraft, the propulsion system including:
 a main gas turbine engine adapted for generating propulsive thrust during subsonic and supersonic flight operations of the aircraft;
 a supplementary propulsion unit adapted for generating additional propulsive thrust, the supplementary propulsion unit having an air intake and an exhaust for gas accelerated by the supplementary propulsion unit to provide the additional propulsive thrust, and the supplementary propulsion unit being further adapted to generate the additional propulsive thrust during a limited range of subsonic flight operations, and to be dormant during other flight operations; and
 a housing for the supplementary propulsion unit, the housing including an intake cover and an exhaust cover which are controllably moveable between deployed and stowed configurations, wherein during the limited range of subsonic flight operations the intake cover and the exhaust cover are moved to the deployed configuration to open the intake and the exhaust, and during the other flight operations the intake cover and the exhaust cover are moved to the stowed configuration to close the intake and the exhaust.

The main engine typically generates propulsive thrust over the entire flight cycle of the aircraft, which may include a period of supersonic cruise. Accordingly, it generally has features to enable supersonic flight operation, such as a specially shaped inlet and a low bypass ratio turbofan configuration. On the other hand, the limited range of subsonic flight operations for which the supplementary propulsion unit generates the additional propulsive thrust may include only low speed subsonic operations, such as take-off and initial climb. Thus the supplementary propulsion unit can be configured to efficiently perform specifically these operations, during which it shares the overall propulsive thrust burden with the main engine. In this way, the energy and hence velocity of the main engine exhaust can be decreased, allowing the main engine to operate more efficiently and with less generated noise over the limited range of subsonic flight operations. Also the main engine can be better sized for supersonic cruise thrust.

However, in order that the supplementary propulsion unit can generate the additional propulsive thrust efficiently and quietly, it is typically unsuitable for use during the other flight operations, such as high subsonic and supersonic flight, and hence is dormant during these operations. Accordingly, in order to reduce the drag penalty associated with the presence of the dormant unit, the intake and exhaust covers move to the stowed configuration to close its intake and exhaust at these times. The external surface of the housing in the stowed configuration may be shaped for reduced drag at high subsonic and supersonic flight operations.

In a second aspect, the present disclosure provides a supersonic aircraft having the propulsion system according to the first aspect.

Optional features of the present disclosure will now be set out. These are applicable singly or in any combination with any aspect of the present disclosure.

The housing may be in the form of a pod having a tubular central portion containing the supplementary propulsion unit such that one end of the central portion forms the intake and the other end forms the exhaust, the intake cover and the exhaust cover being respective end portions of the pod, wherein in the stowed configuration the intake cover, the exhaust cover and the central portion provide the housing with a continuous and smoothly faired external surface. The tubular central portion may be cigar or cylinder-shaped, and may have a circular or rectangular cross-section. Conveniently, the intake cover and the exhaust cover may be in the form of respective plugs and in the deployed configuration the intake plug and the exhaust plug are translated axially away from the central portion to form respective annular openings fluidly connecting respectively the intake and the exhaust to ambient air. In this case, the exhaust plug may have an external surface which is convexly shaped to guide the accelerated gas thereover by the Coanda effect such that the guided gas converges on a centre line of the exhaust. Another option, however, is to form the intake cover and the exhaust cover as respective doors. These can pivot or slide to move between the stowed and deployed configurations.

Conveniently, the supplementary propulsion unit may be configured to be mounted at the base of an aircraft tail fin or at the tail of an aircraft fuselage.

The supplementary propulsion unit may be a fan unit comprising the intake, a fan and the exhaust, the intake guiding air to the fan, and the exhaust discharging air accelerated by the fan. In this case, the propulsion system may further include a power transmission sub-system which is controllably engageable to permit power transfer from the main engine to drive the fan during the limited range of subsonic flight operations, and which is controllably disengagable to interrupt such power transfer during the other flight operations. Such an arrangement, by actively transferring power from the main engine to the fan unit, further helps to reduce the energy and hence velocity of the main engine exhaust. The power transmission sub-system may be a mechanical torque transmission pathway including a clutch which is controllably engagable/disengagable to respectively permit/interrupt the power transfer. Other options, however, are possible. For example, in a more electrical arrangement, the fan may be electrically powered and the power transmission sub-system may be an electromechanical sub-system including a generator which is driven by the main engine to generate an electrical power supply which drives the fan, the sub-system being controllable to respectively permit/interrupt the power transfer.

Another option is for the supplementary propulsion unit to be an engine unit comprising the intake, a supplementary gas turbine engine and the exhaust, the intake guiding air to the supplementary engine, and the exhaust discharging working gas accelerated by the supplementary engine. This allows the supplementary propulsion unit to be operated independently of the main engine, but in general does not result in power transfer from the main engine to the supplementary propulsion unit.

The propulsion system may include plural main gas turbine engines. In particular, when the supplementary propulsion unit is a fan unit as described above, the propulsion system may also include plural power transmission sub-systems such that each main engine has a respective power transmission sub-system which is controllably engageable to permit power transfer from that main engine to drive the fan.

Additionally or alternatively, the propulsion system may include plural supplementary propulsion units. In particular, when the supplementary propulsion units are fan units as described above, the propulsion system may also include plural power transmission sub-systems such that each fan unit has a respective power transmission sub-system which is controllably engageable to permit power transfer from the main engine to drive the fan of that unit.

BRIEF DESCRIPTION OF THE DRAWINGS

Embodiments of the present disclosure will now be described by way of example with reference to the accompanying drawings in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
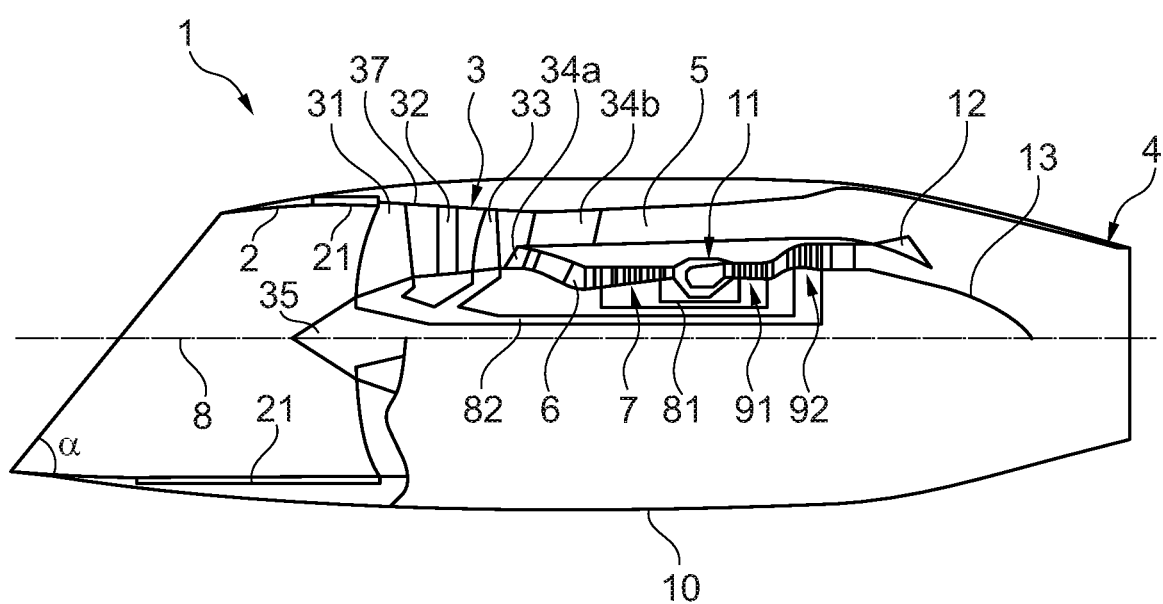
FIG. 1 shows a longitudinal cross-section through a ducted fan gas turbine main engine for supersonic flight operation of an aircraft.

FIG. 1 shows a longitudinal cross-section through a turbofan engine 1 for a civil supersonic aircraft. The turbofan engine 1 comprises an engine intake 2, a multi-stage fan 3, a primary flow channel 6 that leads through a core engine, a secondary flow channel 5 that leads past the core engine, a mixer 12, and a thrust nozzle 4 into which a thrust reverser (not shown) can be integrated.

The turbofan engine 1 has a machine axis or engine centre line 8. The machine axis 8 defines an axial direction of the turbofan engine. A radial direction of the turbofan engine extends perpendicularly to the axial direction.

The core engine comprises in a per se known manner a compressor 7, a combustion chamber 11 and a turbine 91, 92. In the shown exemplary embodiment, the compressor comprises a high-pressure compressor 7. A low-pressure compressor is formed by the areas of the multi-stage fan rotor 3 that are located close to the hub. The turbine that is arranged behind the combustion chamber 11 comprises a high-pressure turbine 91 and a low-pressure turbine 92. The high-pressure turbine 91 drives a high-pressure shaft 81 that connects the high-pressure turbine 91 to the high-pressure compressor 7. The low-pressure turbine 92 drives a low-pressure shaft 82 that connects the low-pressure turbine 92 to the multi-stage fan 3.

The turbofan engine 1 is arranged inside an engine nacelle 10. It is connected to the aircraft fuselage, for example via a pylon.

The engine intake 2 forms a supersonic air inlet and is correspondingly provided and suitable for slowing down the inflowing air to velocities of below Ma 1.0. In FIG. 1, but not necessarily, the engine intake is bevelled, forming an angle α, wherein the lower edge projects with respect to the upper edge. This serves for a better upward distribution of compression shocks as they occur in supersonic flight. However, in principle the engine intake can be formed in a straight manner, i.e. with an angle α of 90°, or a different angle than the one shown.

The engine intake 2 can have an interior cladding of a sound-absorbing material 21. This serves for reducing engine noise.

The fan 3 can be formed as a multi-stage fan, in the shown exemplary embodiment as a double-stage fan. Accordingly, the multi-stage fan 3 comprises a fan rotor 31 and a fan stator 32 that form a first, frontal fan stage, as well as a fan rotor 33 and a fan stator 34a, 34b that form a second, rear fan stage. Upstream, the fan 3 is provided with a nose cone 35. The fan rotors 31, 33 respectively comprise a plurality of rotor blades. The fan stator 32 of the frontal fan stage comprises a plurality of stator blades that are mounted in a fan housing 37. The fan stator of the rear fan stage is split and is formed by a guide baffle 34a that is formed at the entry of the primary flow channel 6, and formed by a guide baffle 34b that is formed at the entry of the secondary flow channel 5. The fan rotors 31, 33 can be configured in BUSK design and can be fixedly attached to each other.

Behind the fan rotor 33, the flow channel through the fan 3 is divided into the primary flow channel 6 and the secondary flow channel 5. Thus, both fan rotors 31, 33 are located upstream of the division of the flow channel into the primary flow channel 6 and the secondary flow channel 5. The secondary flow channel 5 is also referred to as the bypass flow channel or the bypass channel.

Behind the core engine, the primary flow inside the primary flow channel 6 and the secondary flow inside the secondary flow channel 5 are mixed by the mixer 12. Further, an outlet cone 13 is inserted behind the turbine to realize the desired cross sections of the flow channel. The thrust nozzle 4 can be a variable area thrust nozzle.

Other gas turbine engines to which the present disclosure may be applied may have alternative configurations. By way of example such engines may have a different number of interconnecting shafts (e.g. one or three) and/or a different number of compressors and/or turbines. Further the engine may comprise a gearbox provided in the drive train from a turbine to a compressor and/or fan.

Figure 2A:
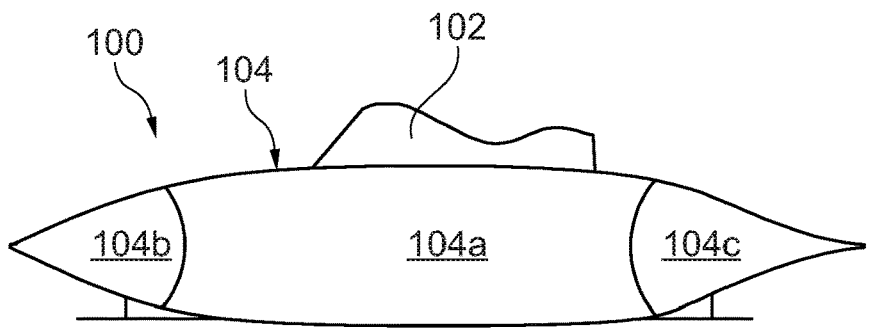
FIG. 2A shows a schematic side view of a supplementary propulsion unit of the aircraft for use in combination with the main engine of FIG. 1.
Figure 2B:
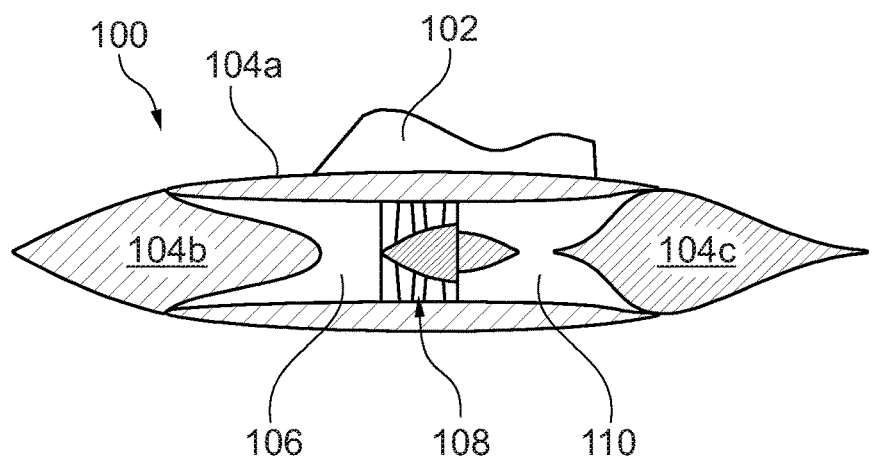
FIG. 2B shows a schematic longitudinal cross-section through the supplementary propulsion unit of FIG. 2A with intake and exhaust plugs in a stowed position.

FIG. 2A shows a schematic side view of a supplementary propulsion unit 100 of the aircraft for use in combination with the main engine 1 described above, and FIG. 2B shows a schematic longitudinal cross-section through the supplementary propulsion unit. The unit is mounted, for example at the base of the tail fin 102 of the aircraft, and has a pod-shaped housing 104 formed of a tubular central portion 104a, an intake plug 104b at one end of the cylinder, and an exhaust plug 104c at the other end of the cylinder. The plugs are translatable in the axial direction of the cylinder from a stowed position shown in FIGS. 2A and 2B to a deployed position shown in FIG. 2C. In the stowed position, the central portion and the plugs provide the housing with a continuous and smoothly faired external surface.

The central portion 104a of the housing 104 contains an intake 106, a fan 108 and an exhaust 110, the intake guiding air to the fan, and the exhaust discharging air accelerated by the fan. In the stowed position, the plugs 104a, 104b block respectively the intake and the exhaust. However, when moved to the deployed position shown in FIG. 2C, annular openings to the intake and the exhaust and the exhaust are revealed such that, as indicated propulsion by arrows, ambient air can enter the intake and be guided to the fan, and air accelerated by the fan 108 can be discharged rearwardly via the exhaust over the external surface of the exhaust plug 104c. This external surface can be convexly shaped to guide the discharged air thereover by the Coanda effect such that the guided air converges on the centre line of the exhaust.

Figure 3:
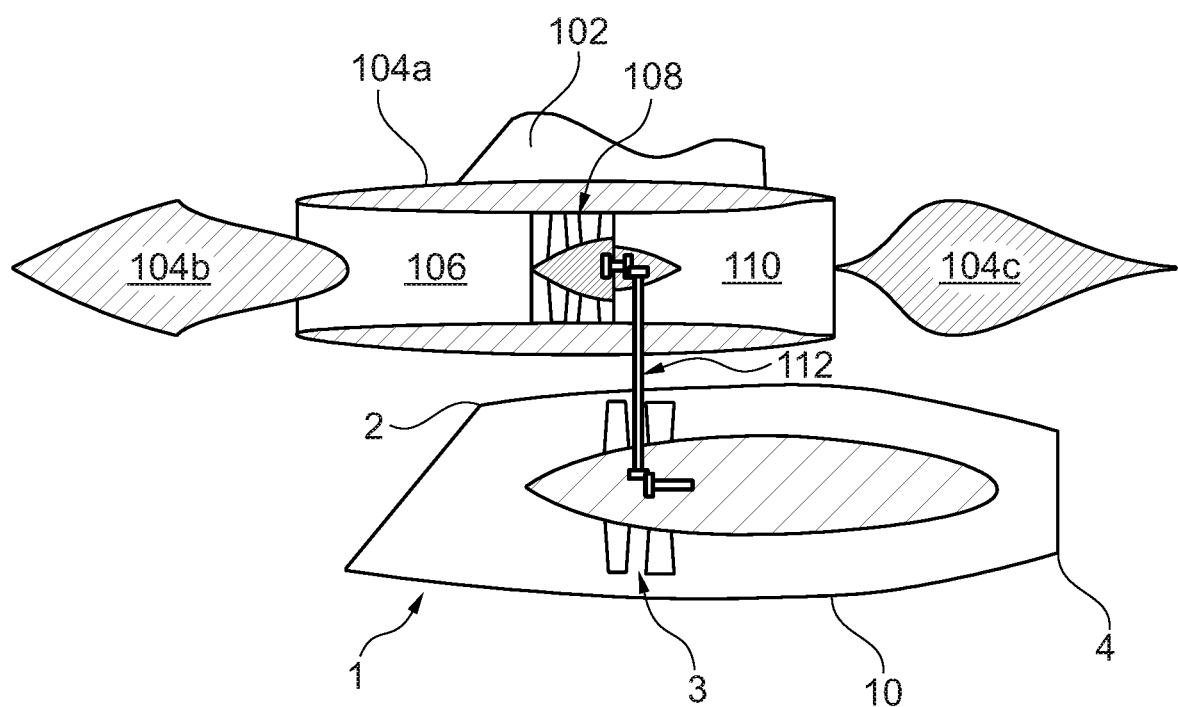
FIG. 3 shows schematically the main engine, the supplementary propulsion unit, and power transmission sub-system by which rotary drive can be transferred from a shaft of the main engine 1 to a fan of the supplementary propulsion unit.

To turn the fan 108, as shown in FIG. 3, the supplementary propulsion unit 100 includes a power transmission sub-system in the form of a mechanical torque transmission pathway 112 (e.g. comprising drive shafts and bevel gears) by which rotary drive can be transferred from a shaft 81, 82 of the main engine 1 to the fan. By repeating such arrangements, the fan can be powered by more than one main engine. Thus a convenient combined propulsion system for the aircraft has two main engines 1 mounted on opposite sides at the rear of the aircraft fuselage, both being used to power the tail fin-mounted supplementary propulsion unit 100 via respective power transmission sub-systems.

Advantageously, the mechanical torque transmission pathway 112 can include a clutch which is controllably engagable and disengagable to respectively permit and interrupt power transfer from the main engine 1 to the fan 108. Thus the main engine 1 generates propulsive thrust over the entire flight cycle of the aircraft, including take-off, climb and supersonic cruise. The fan, by contrast, is used to generate additional propulsive thrust over only a limited range of low speed subsonic flight operations, typically including take-off and initial climb. This allows the energy and hence velocity of the main engine exhaust to be decreased so that the main engine operates more efficiently and with less generated noise during this limited range of subsonic flight operations. Indeed, actively transferring power from the main engine to the fan further helps to reduce the energy and hence velocity of the main engine exhaust. A further benefit is that the main engine can be better sized for cruise thrust.

Figure 2C:
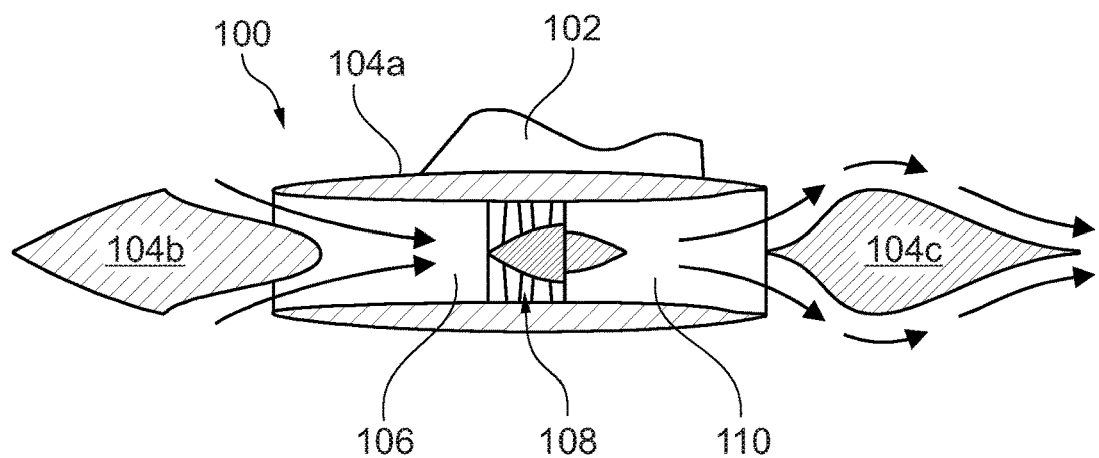
FIG. 2C shows a schematic longitudinal cross-section through the supplementary propulsion unit of FIG. 2A with the intake and exhaust plugs in a deployed position.

Evidently, when the clutch is engaged and the fan 108 powered, the intake and exhaust plugs 104b, 104c are held in the deployed position shown in FIG. 2C. In contrast, when the clutch is disengaged and the fan is dormant, the plugs are held in the stowed position shown in FIG. 2B to reduce the drag penalty associated with the supplementary propulsion unit 100. Because the aircraft speed is low when the supplementary propulsion unit 100 is in use, the intake 106 can be configured for subsonic conditions and a low inlet recovery factor. Similarly, the exhaust 110 only needs to be configured for a limited range of conditions encountered during take-off and climb.

Although the power transmission sub-system is described above in relation to a mechanical torque transmission pathway 112, other options for the sub-system are possible. For example, a more electrical power transmission sub-system may include a generator which is driven by the main engine 1, and which in turn electrically powers the fan 108.

Moreover, a variant supplementary propulsion unit may have an entire supplementary gas turbine engine (i.e. complete with combustor and turbine) between the intake 106 and the exhaust 110 rather than just a fan driven by the main engine 1. In this variant, the exhaust therefore discharges working gas accelerated by the supplementary engine. The variant supplementary propulsion unit does not require a power transmission sub-system, and can be operated independently of the main engine. Moreover, it can be configured for use in just a limited range of subsonic flight conditions, and may therefore have a low overall pressure ratio. However, it does not result in power transfer from the main engine 1 to the supplementary propulsion unit, and its exhaust jet may itself produce more noise than would be produced by air simply accelerated by a fan.

Other variants are also possible. For example, the supplementary propulsion unit may be mounted in the fuselage tail. In this case it may be convenient for its intake to have an "S-shape" duct configuration. Also differing numbers of main engines and supplementary propulsion units are possible. For example there could be more than one supplementary propulsion unit, each driven by a separate main engine, or a single main engine driving two or more supplementary propulsion units. In a variant of the housing, instead of using plugs to open and close the intake and an exhaust, pivoting or sliding doors can perform this function. Like the plugs, in the stowed state, such doors can form a continuous and smoothly faired external surface with the central portion of the housing. In the deployed state, the doors can be moved completely out of the way of the intake and the exhaust.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

I claim:

1. A propulsion system for a supersonic aircraft, the propulsion system including:
    a main gas turbine engine adapted for generating propulsive thrust during subsonic and supersonic flight operations of the aircraft;
    a supplementary propulsion unit adapted for generating additional propulsive thrust, the supplementary propulsion unit having an air intake and an exhaust for gas accelerated by the supplementary propulsion unit to provide the additional propulsive thrust, and the supplementary propulsion unit being adapted to generate the additional propulsive thrust during a limited range of subsonic flight operations, and to be dormant during other flight operations; and
    a housing for the supplementary propulsion unit, the housing including an intake cover and an exhaust cover which are controllably moveable between deployed and stowed configurations, wherein
        during the limited range of subsonic flight operations, the intake cover and the exhaust cover are configured to move to the deployed configuration, and during the other flight operations, the intake cover and the exhaust cover are configured to move to the stowed configuration,
        when in the deployed configuration, the intake cover and the exhaust cover are open, and when in the stowed configuration, the intake cover and the exhaust cover are closed, and
        when the intake cover and the exhaust cover are in the deployed configuration, the intake cover and the exhaust cover are translated axially away from a central portion of the housing to form respective annular openings fluidly connecting respectively the intake and the exhaust to ambient air.

2. The propulsion system according to claim 1, wherein the housing is in the form of a pod, the central portion of the housing being tubular, the central portion containing the supplementary propulsion unit such that one end of the central portion forms the intake and the other end forms the exhaust, the intake cover and the exhaust cover being respective end portions of the pod, and
    when the propulsion system is in the stowed configuration, the intake cover, the exhaust cover, and the central portion provide the housing with a continuous and smoothly faired external surface.

3. The propulsion system according to claim 2, wherein the intake cover and the exhaust cover are in the form of respective plugs.

4. The propulsion system according to claim 3, wherein the exhaust plug has an external surface which is convexly shaped to guide the accelerated gas thereover by the Coanda effect such that guided gas converges on a center line of the exhaust.

5. The propulsion system according to claim 1, wherein the supplementary propulsion unit is configured to be mounted at a base of an aircraft tail fin or at a tail of an aircraft fuselage.

6. The propulsion system according to claim 1, wherein:
    the supplementary propulsion unit is a fan unit comprising the intake, a fan and the exhaust, the intake guiding air to the fan, and the exhaust discharging air accelerated by the fan; and
    the propulsion system further includes a power transmission sub-system which is controllably engageable to permit power transfer from the main gas turbine engine to drive the fan during the limited range of subsonic flight operations, and which is controllably disengagable to interrupt such power transfer during the other flight operations.

7. The propulsion system according to claim 6, wherein the power transmission sub-system is a mechanical torque transmission pathway including a clutch which is controllably engagable/disengagable to respectively permit/interrupt the power transfer.

8. The propulsion system according to claim 6, wherein the fan is electrically powered and the power transmission sub-system is an electro-mechanical sub-system including a generator which is driven by the main gas turbine engine to generate an electrical power supply which drives the fan, the sub-system being controllable to respectively permit/interrupt the power transfer.

9. The propulsion system according to claim 1, wherein the supplementary propulsion unit is an engine unit comprising the intake, a supplementary gas turbine engine, and the exhaust, the intake guiding air to the supplementary engine, and the exhaust discharging working gas accelerated by the supplementary engine.

10. The propulsion system according to claim 1, further comprising plural main gas turbine engines.

11. The propulsion system according to claim 6, further comprising plural main gas turbine engines and plural power transmission sub-systems such that each main gas turbine engine has a respective power transmission sub-system which is controllably engageable to permit power transfer from that main gas turbine engine to drive the fan.

12. The propulsion system according to claim 1, further comprising plural supplementary propulsion units.

13. The propulsion system according to claim 6, further comprising plural fan units and plural power transmission sub-systems such that each fan unit has a respective power transmission sub system which is controllably engageable to permit power transfer from the main gas turbine engine to drive at least one of the plural fan units.

14. A supersonic aircraft having the propulsion system according to claim 1.

15. A propulsion system for a supersonic aircraft, the propulsion system including:
    a main gas turbine engine adapted for generating propulsive thrust during subsonic and supersonic flight operations of the aircraft;
    a supplementary propulsion unit adapted for generating additional propulsive thrust, the supplementary propulsion unit having an air intake and an exhaust for gas accelerated by the supplementary propulsion unit to provide the additional propulsive thrust, and the supplementary propulsion unit being adapted to generate the additional propulsive thrust during a limited range of subsonic flight operations, and to be dormant during other flight operations; and a housing for the supplementary propulsion unit, the housing including an intake cover and an exhaust cover which are controllably moveable between deployed and stowed configurations, wherein:

during the limited range of subsonic flight operations, the intake cover and the exhaust cover are configured to move to the deployed configuration, and during the other flight operations, the intake cover and the exhaust cover are configured to move to the stowed configurations, when in the deployed configuration, the intake cover and the exhaust cover are open, and when in the stowed configuration, the intake cover and the exhaust cover are closed, the housing is in the form of a pod, a central portion of the housing being tubular, the central portion containing the supplementary propulsion unit such that one end of the central portion forms the intake and the other end forms the exhaust, the intake cover and the exhaust cover being respective end portions of the pod, when the propulsion system is in the stowed configuration, the intake cover, the exhaust cover, and the central portion provide the housing with a continuous and smoothly faired external surface, and the intake cover and the exhaust cover are in the form of respective plugs and when in the deployed configuration the intake plug and the exhaust plug are translated axially away from the central portion to form respective annular openings fluidly connecting respectively the intake and the exhaust to ambient air.

* * * * *